United States Patent [19]

Crouse et al.

[11] Patent Number: 4,644,108

[45] Date of Patent: Feb. 17, 1987

[54] ADAPTIVE SUB-BAND ECHO SUPPRESSOR

[75] Inventors: William G. Crouse; David R. Irvin, both of Raleigh, N.C.

[73] Assignee: International Business Machines Corporation, Armonk, N.Y.

[21] Appl. No.: 437,093

[22] Filed: Oct. 27, 1982

[51] Int. Cl.[4] .............................................. H04B 3/20
[52] U.S. Cl. .................................... 379/406; 379/395
[58] Field of Search ............... 179/170.2, 170.6, 170.8

[56] References Cited

U.S. PATENT DOCUMENTS

| Re. 28,919 | 7/1976 | Berkley et al. | 179/170.8 |
|---|---|---|---|
| 3,567,873 | 3/1971 | Peroni | 179/170.2 |
| 3,699,271 | 10/1972 | Berkley et al. | 179/170.8 |
| 3,900,708 | 8/1975 | Bendel | 179/170.2 |
| 4,012,603 | 3/1977 | Areski et al. | 179/170.6 |
| 4,031,338 | 6/1977 | Campanella et al. | 179/170.8 |
| 4,130,743 | 12/1978 | Boulanger et al. | 179/170.2 |
| 4,368,360 | 1/1983 | Sato et al. | 179/170.2 |

OTHER PUBLICATIONS

"Le Suppressor d'echo F4", C. Boulanger, Cables and Transmission, vol. 28, No. 2, Apr. 1974, pp. 168-177.
"Digital Adaptive Echo Suppressor", T Areski et al., International Conference on Communications, vol. 3, Subno. 21, pp. 36-4-36-8, Jun. 14-16, 1976.

*Primary Examiner*—Gene Z. Rubinson
*Assistant Examiner*—R. Vaas
*Attorney, Agent, or Firm*—Edward H. Duffield

[57] ABSTRACT

The subject suppressor is an improved form of echo suppressor used in conjunction with adaptive sub-band speech coders. The suppressor analyzes and uses N contiguous sub-bands of a sub-band speech coder. The intermediate results calculated during the normal operation of such speech coders may be analyzed in the suppressor to determine predictions for the echo levels of each sub-band and to set break in and break out thresholds. A substantial performance improvement with little increase in complexity over current echo suppressors is achieved. The subject suppressor may also be used with adaptive transform speech coders in which the corner frequency points define the edges of "sub-bands" for purposes of this invention. Sub-bands are defined here as contiguous segments of the frequency-energy spectrum. The sub-bands so defined can be formed or analytically divided by a bank of filters as in normal sub-band coders or they can be identified or analyzed as noted above by the corner points of an adaptive transform coder.

2 Claims, 12 Drawing Figures

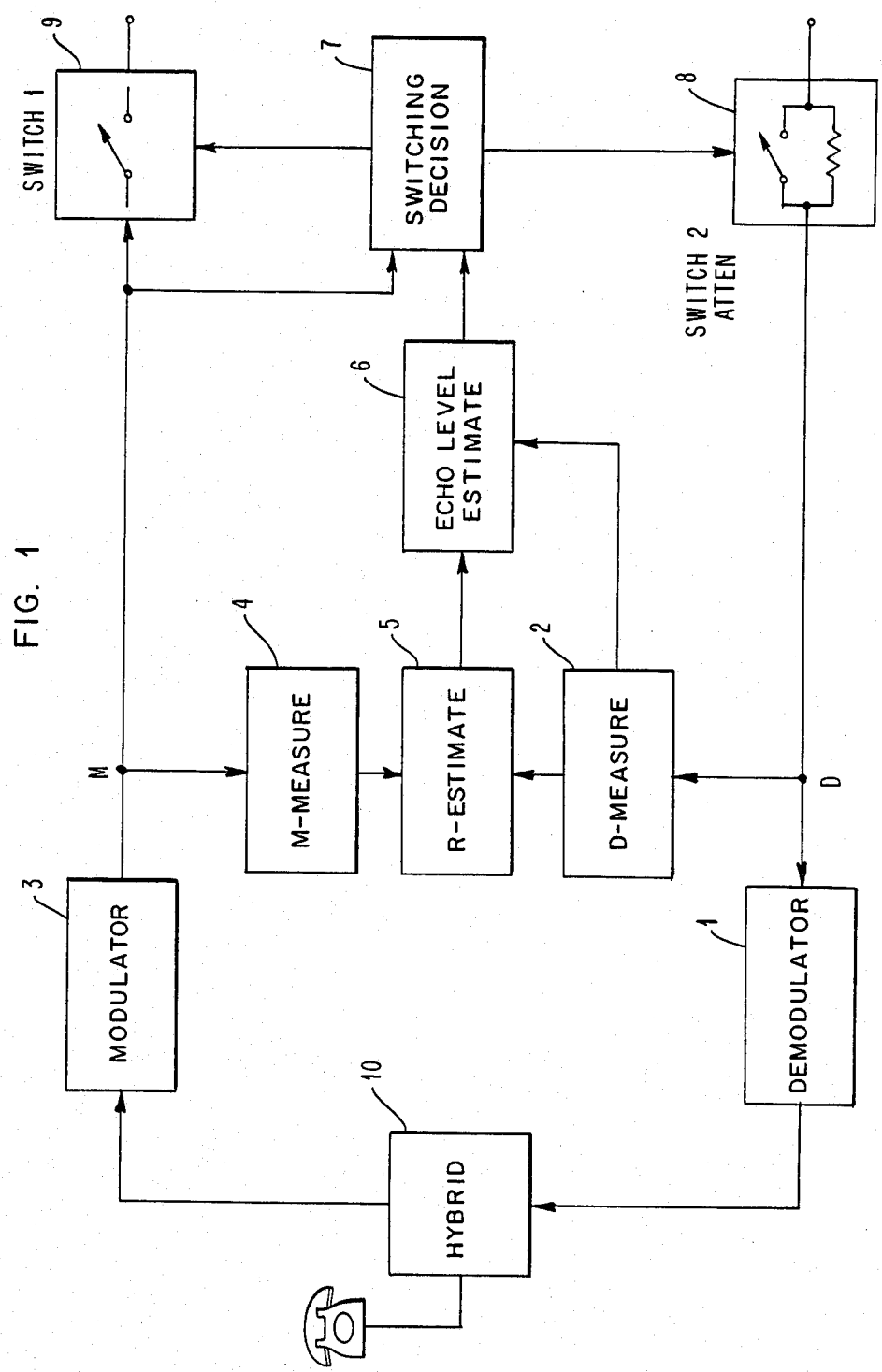

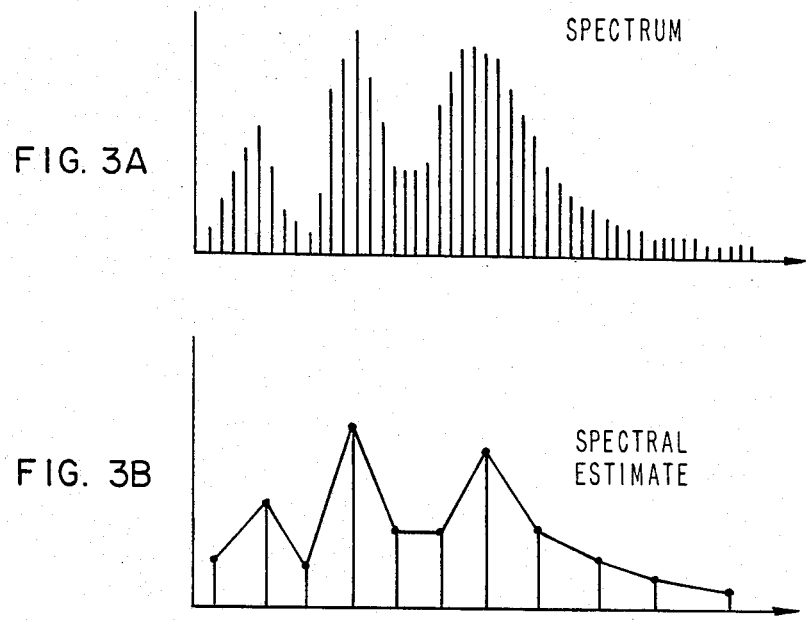
FIG. 3A SPECTRUM
FIG. 3B SPECTRAL ESTIMATE
FIG. 4
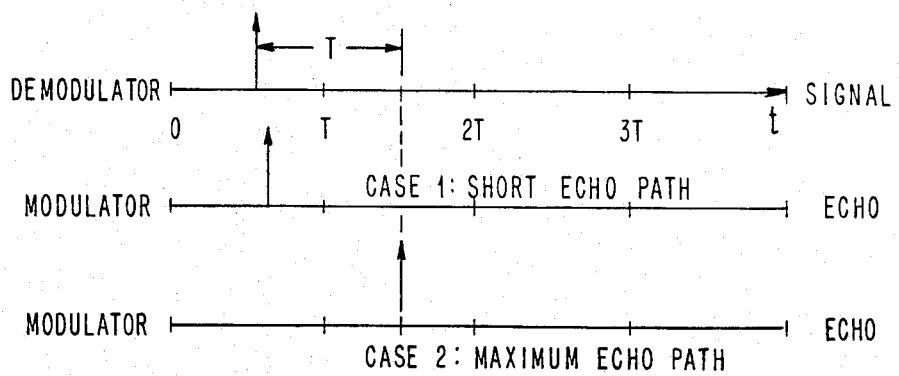

FIG. 5A
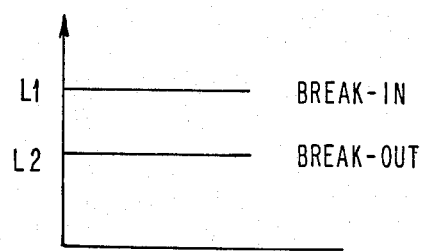
FIG. 5B
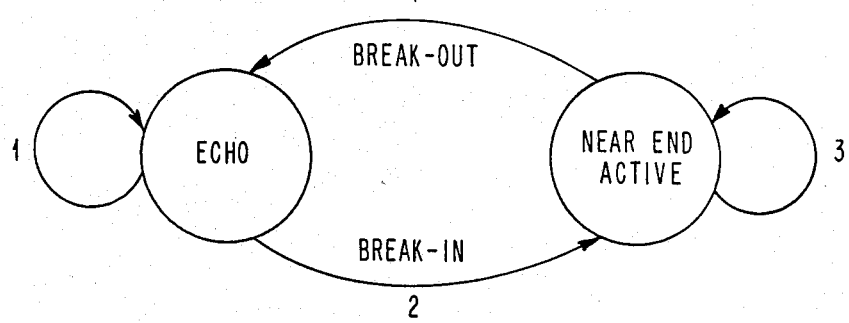
FIG. 5C
| M OUTPUT BAND ENERGY | PRESENT STATE | TRANSITION |
|---|---|---|
| M < L1 | ECHO | 1 |
| M > L1 | ECHO | 2 |
| L1 < M < L2 | NEAR END ACTIVE | 3 |
| M < L2 | NEAR END ACTIVE | 4 |

ADAPTIVE SUB-BAND ECHO SUPPRESSOR

FIELD OF THE INVENTION

This invention relates to speech processing systems in general and to echo suppressors utilized with sub-band and transform voice coders in particular.

PRIOR ART

Numerous echo suppressors are known in the prior art. The general suppressor and speech coder devices are known but the improved, adaptive device described herein is believed to be novel.

Prior art echo suppressors are intended to reduce or eliminate listener perceived echoes in a telephone line system that contains a hybrid junction. The echos are caused by mismatched line impedances which occur usually at the junction of a four wire telephone line and a hybrid circuit. A split echo suppressor is employed in the present invention in which the near end suppressor is responsible for reducing the echo perceived at the far end but resulting from near end hybrid mismatch. Similarly, the far end suppressor is responsible for decreasing the echo perceived by the near end user.

In general, echo suppressors are operated either on the absolute echo energy perceived, passively or actively, or on some measure of the echo return loss. The present invention utilizes a measure of the echo return loss at each end of the communication system to independently control the echo suppressor at its own end.

As an estimate of the echo return loss, R, a definition of the modulator to demodulator energy ratio over the echo path is defined as $R=M/D$. R is the measure of an echo return loss at the near end for example. An estimate of the expected echo level present at the input to the modulator at any particular instant is expressed as $E=R\times D$. When a signal at the modulator is found to be at or below the expected echo level, the signal at the modulator's input is deemed to be echo. The echo path will then be interrupted and a path attenuator removed. The echo path interruption switch and the path attenuator are both known in the prior art. When a near end user begins to speak, the signal at the input to the modulator will be greater than the expected echo level. The path in the echo system can then be closed by closing the aforesaid switch which allows the near end user to interrupt the conversation. When this occurs, the path attenuator is reinserted to reduce echo observed at the far end listener's station.

A difficulty with the known prior art is that the ratio R varies considerably from line to line. R may experience short term changes as well when, for example, terminations are changed by a local PBX. A further difficulty with the known prior art is that signficant clipping as a result of the suppressor operation may be observed. The decision between the presence of voice as opposed to echoes at the near end user's station can seriously degrade the speech quality received at the far end. This is due to the fact that initiation of speaking must be detected rapidly at the near end in order to complete the voice path left normally open to suppress echos.

The present invention has an echo suppressor which incorporates a periodically updated estimate of the R value. This estimate is generated with inertia and a variable initial attack time. A dual threshold switching control is utilized which has a break in level and a lower break out level. The break in level is adaptively controlled while the break out level tracks the break in level with a fixed offset.

OBJECTS OF THE INVENTION

An object of the present invention is to provide an improved echo suppressor for use with sub-band speech coders in which each of the coder's N sub-bands is analyzed and independent decisions are made to allow break in or break out for any band exceeding or falling below adaptively set threshold levels.

Still another object of the present invention is to provide an improved echo return loss estimate which adapts to the band frequency domain characterstics of the associated echo path.

Still another object of the present invention is to provide an improved echo suppressor operating in combination with a speech coder of the transform variety in which adjacent corner frequencies are used to define sub-band frequency spectrum segments for purposes of this invention.

SUMMARY

An N band adaptive echo suppressor is set forth which utilizes an N band sub-band speech coder to form and analyze independent sub-band estimates of the echo return loss. Periodically updated estimates of the echo return loss are given an inertial weighting and a variable initial attack time. These are utilized for comparison against a double level switching threshold to control break in (voice detection) and break out levels for operating the suppressor. The echo return loss estimates are used to predict the echo levels in each of the sub-bands and to set break in and break out levels independently for each sub-band. The band by band analysis and decision minimizes the subjectively judged impact of the suppressor. When a near end speaker is not producing energy in a given band, the echo path for that band will be interrupted. Eliminating the echo path for energy in a given band reduces the echo intelligibility at the far end user's point. In an extreme case, a low pitched speaker on one end and a high pitched speaker on the other may enjoy an echo free, full duplex transmission under the present invention. The echo return loss estimate expressed as R is adaptively updated.

The adaptive echo suppressor set forth may also utilize N spectral points selected from the M output points of the transform operation performed by an adaptive transform speech coder. The N spectral points can be used to define for analysis contiguous sub-band portions or segments of the frequency spectrum. While these sub-bands may not be identical in frequency to the usual sub-bands defined by filter banks, the effect is the same for this invention. Independent estimates of the echo return loss at the N chosen spectral points, are formed, with weighting and updating as described, and a series of independent decisions is reached. Segments of the spectrum so defined constitute "sub-bands" also. Those which are to contain "echo" will not be transmitted.

BRIEF DESCRIPTION OF THE DRAWINGS

FIG. 1 illustrates a schematic view of the overall functional logic arrangement of an adaptive echo suppressor according to the present invention.

FIGS. 3A and 3B, respectively, illustrate a typical energy spectrum and the resulting spectral estimates at the corner points (which can define sub-bands) generated in a transform coder such as that depicted in FIG. 2B.

FIG. 4 illustrates a timing diagram comparing the delays between the occurrence of a signal at the demodulator and the resulting echo at the output of the modulator for two cases.

FIG. 5A illustrates a dual level break in and break out threshold as utilized in the present invention.

FIG. 5B illustrates a state diagram for the system as utilized in the present invention.

FIG. 5C is an estimated echo and state transition chart utilized in conjunction with FIG. 5B.

DETAILED SPECIFICATION

As a general introduction, the background of typical frequency domain speech coders is depicted in FIG. 2. Some illustrative references to prior art articles will be given. References of interest are as follows.

(1) R. Zelinski and P. Noll, "Adaptive Transform Coding of Speech Signals", *IEEE Trans. on Acoustics, Speech, and Signal Processing*, ASSP-25, No. 4, August 1977, pp. 299–309.

(2) S. Das, "Consideration in the Implementation of an Adaptive Transform Coder . . . ", *Proc. of 1981 Int. Conf. on Acoustics, Speech, and Sig. Proc.*, pp. 636–639.

(3) J. Tribolet and R. Crochiere, "Frequency Domain Coding of Speech", *IEEE Trans. on Acoustics, Speech, and Sig. Proc.*, ASSP-27, Nr. 5, October 1979, p. 524.

(4) T. Araseki and K. Ochiai, "Adaptive Echo Suppressor," Proc. of Third Int'l. conf. on Digital Satellite Communications, 1975.

(5) B. Peroni, "Echo suppression and noise elimination system for telephone circuits", U.S. Pat. No. 3,567,873.

(6) J. F. O'Neill, "Modern Telephone Echo Control Devices", Telecommunications, Vol. 15, No. 3, (March, 1981), pp. 82–84.

Figure 2A:
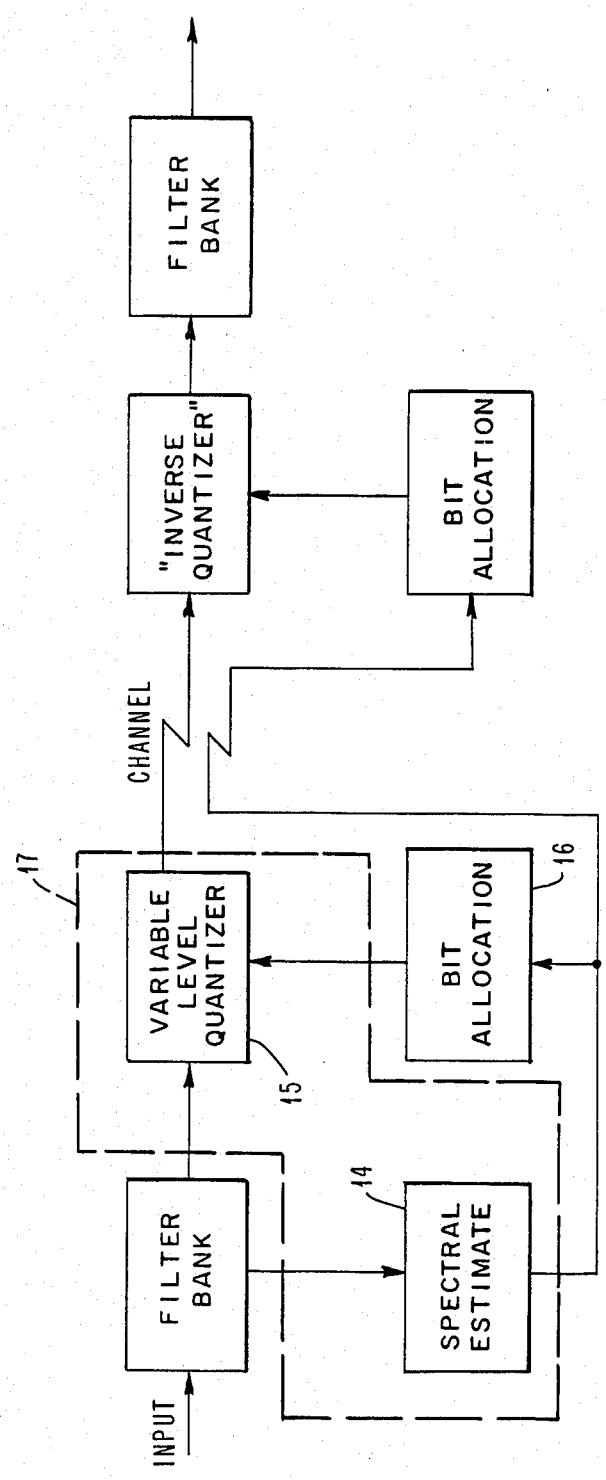
FIG. 2A illustrates a prior art schematic arrangement for sub-band coders as utilized in the present invention.
Figure 2B:
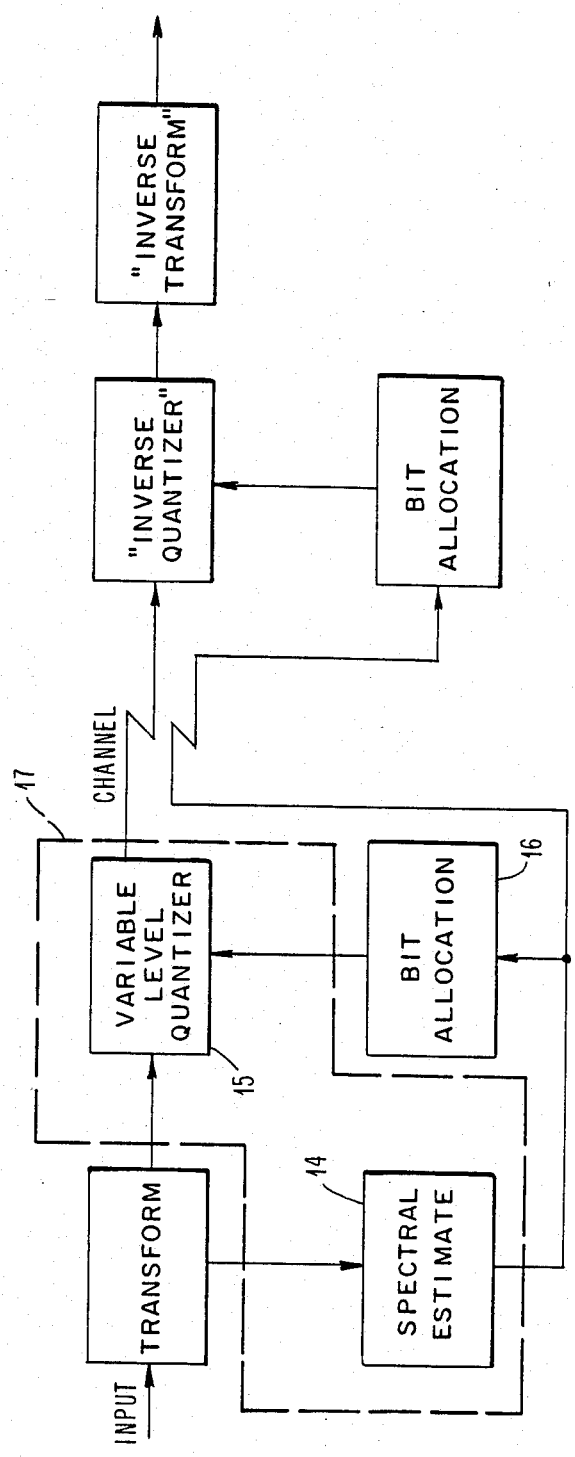
FIG. 2B illustrates a prior art schematic arrangement for adaptive transform coders as utilized in the present invention.

Turning to FIG. 2B, a block of incoming speech samples will be transformed into the frequency domain utilizing a fast Fourier or similar transform characteristic well known in the art, or will be split into sub-bands using a bank of filters as in FIG. 2A and the samples will be quantized and transmitted. The quantization information must also be transmitted to the far end receiver. The bits that are allocated to each quantized sample or sub-band are allocated in proportion to the sample's or sub-band's importance in reconstructing the speech signal at the receiver. The information on how to reconstruct the signal must somehow be signalled to the receiver along with each block of quantized frequency domain samples. Numerous effective techniques have been developed for transmitting the bit allocation from a transmitter to a receiver. The first three references described above amply illustrate these techniques for those interested. An estimate or template of the energy spectrum is formed at the transmitter and sent to the receiver along with the quantized samples. The fine structure of bit allocation is derived at the transmitter and rederived at the receiver from the spectral estimates. The bit allocations so derived are used to encode and decode the actual spectral components or sub-bands. The spectral estimates as shown in FIG. 3B are formed by a set of local averages of the true spectral components in the spectral estimate portion of FIG. 2B. The averages at various points can be used to define the edges of "sub-bands" as used herein for analysis. These are normally called the "corner" points of the spectral components. The spectral estimate for the sub-band coder is the energy content of each sub-band. The peak-value occurring in a sub-band, for a given signal block, is used as an energy estimate in an analysis.

The operation of the sub-band speech coder shown schematically in FIG. 2B generates the spectral estimates as an intermediate product (corner point information) in performing the overall bit allocation and quantization aspects which are known in the art. However, the spectral estimates can also be utilized in the present invention with a minimum of complexity to find an estimate of the echo return loss R for each one of the corner frequencies in the spectral estimate, or in each of the sub-bands of a coder such as shown in FIG. 2A.

Turning to FIG. 1, the demodulator 1 receives during each sample frame N, a set of speech sub-band samples. The demodulator spectral estimate values that result from the sub-band coder and decoder such as shown in FIG. 2A are applied or derived in a D measure function 2 in FIG. 1. Outgoing spectral estimates from the spectral estimator 14 in FIG. 2A or 2B are derived by the modulator 3 in FIG. 1. The resulting spectral estimates are generated in the M measure block 4 and the outputs from 4 and 2 are applied to the R estimating function 5. The R estimate is the echo return loss defined as the ratio of the M measure over the D measure coming from blocks 4 and 2 respectively. These are formed during "near end quiet" frames and modified as described in greater detail below. The echo level estimate 5 that results in block 6 is formed from the product of R and D. The E level utilized is employed to make a switching decision in block 7 to control whether the incoming passive attenuator switch 8 (known in the prior art) is opened or closed and whether the outgoing path interruption switch 9 (known in the prior art) is opened or closed.

The present suppressor finds an estimate of the ratio R for each sub-band or for every corner frequency of the spectral estimate. This is done during each frame N. The initial set of R values is found for each sub-band for several contiguous samples. A reasonable start-up value for R is assumed. Such a value would be approximately 4 dB when the echo path is through an external network and 10 dB when not through a network. Correction increments for the R value are measured and calculated after the first frame in which speech is detected (first valid frame) after two more valid frames, after four more valid frames and after $2^n$ more valid frames, etc. The decrease in the correction frequency provides a variable attack time in correcting the R value. The R value calculated on each new valid frame or multiple valid frame interval is given equal rating with the previous estimate of R to form an equally weighted average for the next or present value of R which is used.

As is well known to those of skill in the art, a frame in an echo suppressor is deemed valid, i.e., contains voice, if the demodulator energy peak measurement D exceeds a preset threshold and if the R value does not exceed the initial estimate (exceeding the initial estimate would be an indication of double talk or near end speech activity).

In a typical example, the frame time will extend over a length of time T determined by the maximum near end echo path duration expected. Echo energy may appear at the modulator instantaneously, or may be delayed up to T seconds, depending upon the length of the unknown path connected to the suppressor. The D energy measure is found for every frame of length T seconds. The M energy value measure is found from the current frame and from the immediately preceding frame. The M frame time is effectively 2T seconds long, therefore, but is updated every T seconds by including the new information. FIG. 4 illustrates the timing of the input signal sample relative to the various possible echo output times which is the time when the echo will be apparent to the input to the modulator.

In a typical transform coder, the operation of the devices is ideally suited for use with a suppressor of this design. A typical coder block length would be 128 frames of speech. This would take 16 milliseconds at an 8 kilohertz sampling rate. If T is fixed at two samples of 16 milliseconds or 32 milliseconds total, it will allow coverage of the maximum near end expected echo path length. The frame for echo determination can be found by averaging two of the transform frames at 16 milliseconds each. In such a scheme, the demodulator energy measure for a frame will be found by averaging two of the transform frames, but the modulator measure of energy will be found by averaging four transform frames. Thus, for a coder with a block length of 256 samples, a one to one correspondence between speech frames and echo frames would exist. Since T is on the order of a pitch period in speech, the rough spectral characteristics will not be expected to show much change during an echo frame of these magnitudes.

As previously described, a decision is made at each corner frequency or sub-band as to whether the frame under consideration represents echo energy, near end speech or double talk. In a system having N sub-bands or corner frequencies, either N single decisions can be reached and utilized to block or unblock the N bands or spectral regions independently, or N votes can be cast to block or unblock the overall channel.

As previously described, the frame time T is determined by the maximum expected near end echo path duration. For a sub-band coder, the demodulator energy peak is found for each sub-band and in each frame of length T seconds. For each sub-band the current demodulator energy peak D and the preceding peak are retained. The modulator energy peak for each sub-band is chosen to be the larger peak from the current modulator energy frame and the preceding modulator frame. Since modulator energy is effectively 2T periods long, half of this frame will be replaced with a new sample every T seconds. This creates an inertial weighting as will be readily appreciated by those skilled in the art.

During any given frame time N, the ratio R will be formed from the D peak of frame N−1 and the larger of the modulator peaks M from frames N or N−1. In order to correct the R value, a correction value, which is an estimate of R itself, must be calculated.

Once per valid frame, R is calculated. The minimum value of the R for each band over the correction interval, which is variable as noted above, is kept as the correction factor. The old value of R is replaced once each correction interval as previously described by the weighted average of the old R value and the new estimate. This represents equal weighting, but is not a necessary factor since either R value may be given greater or lesser significance if desired.

Figure 6:
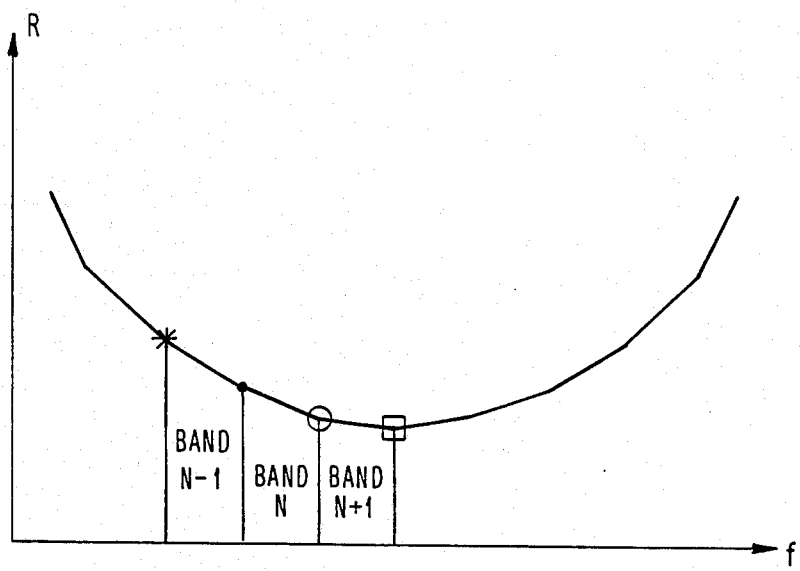
FIG. 6 illustrates the R value skew as a function of frequency and also depicts how the corner points may be utilized as sub-band definitions in a band by band approach.

One difficulty in the final determination of any average value for R results from the fact that R is frequency dependent. Any estimate of R based upon the convergence to a minimum value, such as just described, provides an overly optimistic threshold. When implemented within a speech sub-band system, the R estimate will converge to the best case rather than the worst case for each sub-band. For the reasonably well behaved frequency dependence which is observed in practice (see FIG. 6) the worst case estimate of R for a given band N will be the best case estimate either for band N−1 or band N+1. The final value of R will be determined as the maximum R value found either for the immediately preceding or the immediately following bands that are adjacent in frequency to the band under consideration. In the highest and lowest bands, respectively, a special case exists since there is only one adjacent neighbor for each of these cases but the technique remains the same. The largest value present in three (or two) contiguous bands is therefore chosen as the effective R value for a given band. An additional fixed margin or increment can be included to cover any abnormalities in the system.

Having determined what the R value will be and having described updating the R value, it is necessary to describe further how the break in and break out levels are established.

Break in levels are found for each sub-band or corner frequency based on an echo estimate E. The echo estimate E for each band is based upon the existing R value for the band multiplied by the present demodulator energy estimate for the sub-band. The modulator input energy measurements are compared to the E values and if any modulator energy exceeds the corresponding E value, then the near end is deemed to be active and "speech" is present. Therefore, the speech path will be completed for that band by a decision for passing that portion or that sub-band for transmission.

Figure 7:
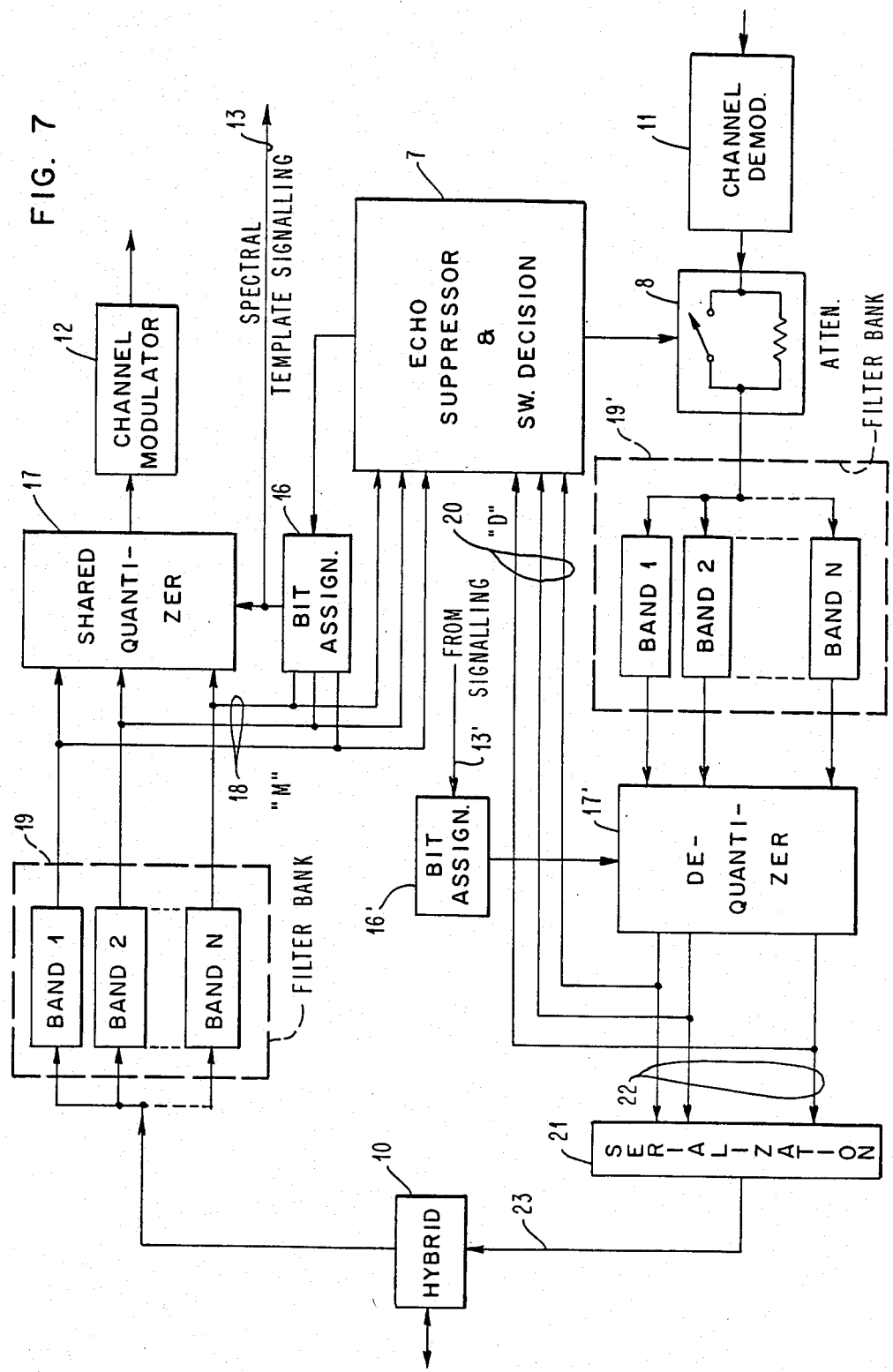
FIG. 7 illustrates a schematic diagram of an N band sub-band echo suppressor constructed in accordance with the present invention.

The overall echo suppressor then becomes an integral part of a sub-band or transform speech coder. This is depicted for a sub-band coder in FIG. 7 in the preferred embodiment. In FIG. 7, the switching of bands is done as a part of the speech coder's bit allocation algorithm. Decisions are made on the basis just described just as if physical switches were used. The allocation of a coder bit to a given sub-band may be granted or denied based upon the determination that "speech" activity is present or absent, respectively, in that sub-band. The equivalent to controlling a switch such as switch 9 in FIG. 1 in the schematic is apparent. Similarly, a common attenuator 8 equivalent to that shown in FIG. 1 may be inserted in each path sub-band whenever "double talk" exists in at least one sub-band. This is for the case when D is active in a given band and the input modulator peak M is greater than the expected echo level for that band.

In FIG. 7, the functions of blocks 2, 4, 5, 6 and 7 are combined in block 7. Receivers or transmitters depicted as channel demodulator 11 or channel modulator 12 have also been added in FIG. 7. The spectral template signalling line is shown schematically as line 13. The quantization function is part of the well-known prior art speech coder as shown in FIG. 2A or B and corresponds to blocks 14 and 15 combined as shown in the dashed lines in block 17 in FIG. 2A or 2B. The designation 17 is carried over into FIG. 7 for the shared quantizer. The bit allocation block 16 responds to the spectral information provided on lines 18 in FIG. 7. It may be understood that the filter bank 19 will sample and analyze the peak within the time frame sample period and will supply it on one of the independent lines 18 as a measure of modulator energy in that specific sub-band. Similarly, on the input side, the dequantizer 17' serves the inverse function of the quantizer 17. It is directed by the bit assignment signalled on line 13' to the bit assignment control 16' as illustrated. The output of the dequantizer include the D peak samples for each sub-band supplied on line 20 as shown. The serializer 21 serializes the speech outputs on lines 22 for output on line 23 to the hybrid circuit 10 for near end use. This gives rise to the echo characteristic and time delay which will later apply energy to the outgoing transmitter bandpass filter bank 19.

Figure 8:
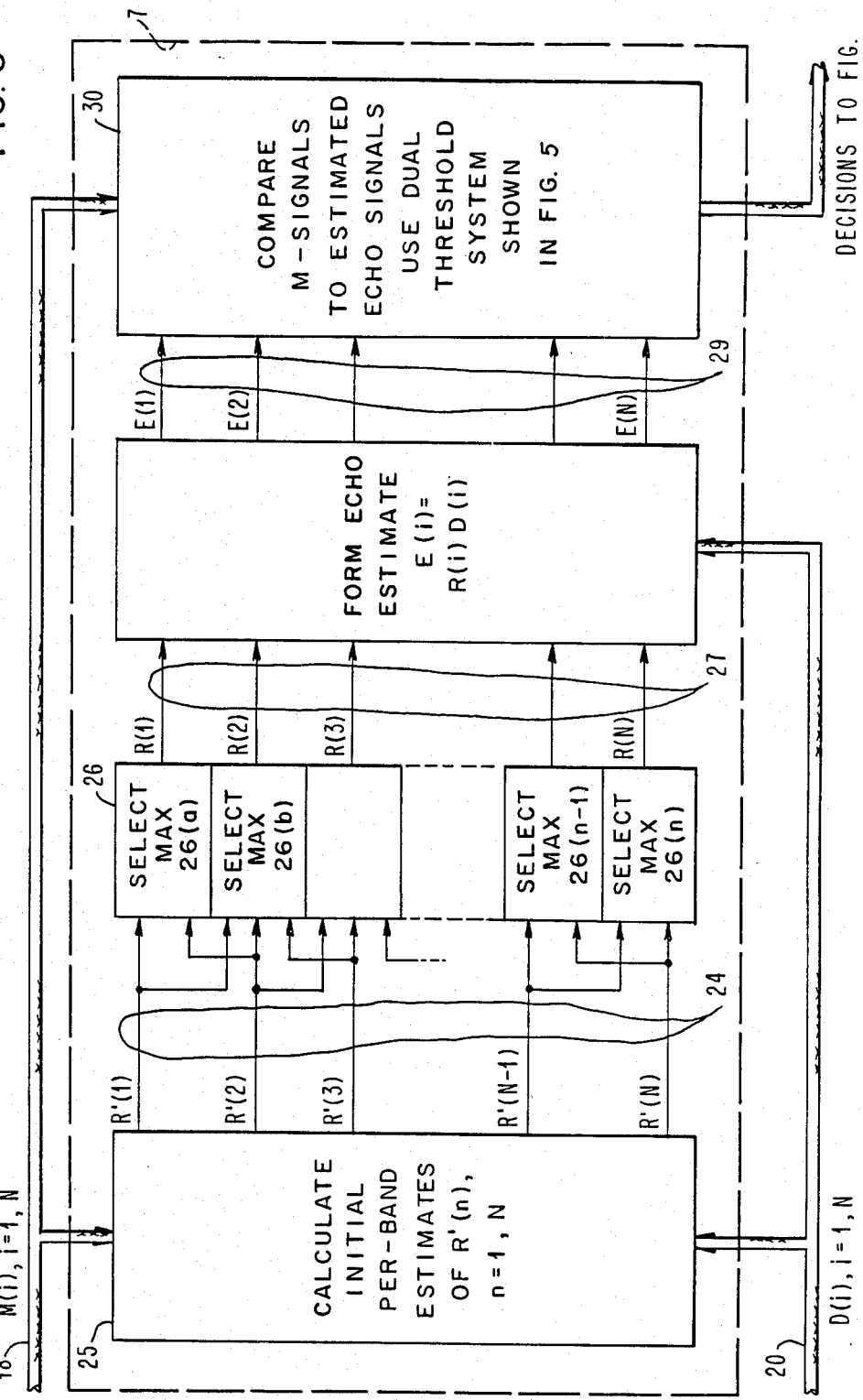
FIG. 8 illustrates in greater detail the echo suppressor employed in FIG. 7 as a preferred embodiment.

The function of the echo suppressor and attenuation and switching decision logic is contained in block 7 of FIG. 7 and is described in greater detail in FIG. 8. From the input on lines 18 and 20 in FIG. 8, the calculation of the initial sub-band estimates of R expressed as $R'(n)$ are formed and are provided on one of the output lines 24. The ratio forming block 25 provides these outputs to two or three selection gates in the selection gate matrix 26 as shown. The selection matrix unit for the gate 26A is connected only to the sub-bands R1 and R2 but each of the other selection gates 26B through 26N−1 are connected to three inputs. The final output is connected to selection gate 26N and to 26N−1 since there is no N+1 sub-band from which to select a maximum. The selection gates 26 select the maximum input and apply it as an output on line 27 as the present estimate of the R value for the sub-band in question. The calculation of the per band estimates of R as done in a variable rate method as previously disclosed where R is updated with each valid frame and each succeeding valid frame $2^n$ where N can take on values from 1 up to some maximum value and thereafter at each maximum value for valid frames received.

Echo estimates are next formed in block 28 by multiplying for each sub-band the current R value received from the selection gate matrix 26 with the incoming sub-band decoder energy estimate measure on line 20. Each of these estimates is outputted on individual line 29 as an echo estimate E. Incoming sub-band modulator energy measurements M on lines 18 are compared in the comparator 30 with each respective sub-band echo energy estimate E as shown. If M exceeds an E estimate for any sub-band, near end "speech" is determined to exist. However, if M is equal to the expected E value or less than E, echo is determined to exist. The state diagram of FIGS. 5A–5C is illustrative.

In FIG. 5A, the break in level is set at a level L1 and the break out level tracks at a fixed increment beneath the break in level and described as level L2.

The state diagram in FIG. 5B illustrates the transition states between echo and the detection of double talk or near end active condition. The various transitions are labeled 1, 2, 3 and 4 respectively and find their representation in the table in FIG. 5C.

INDUSTRIAL APPLICATION

The system of the present invention can be easily utilized in sub-band or transform coded communications systems, particularly telephone systems with digitally coded voice or data features. The invention provides a substantial improvement in performance over the state of the art for echo suppressors. The additional resources needed for implementation of the present invention are a small fraction of those needed for implementing a full echo canceller and utilize very effectively the existing elements of the speech coder to which the suppressor is an augmentation. The band splitting or analyzing filters are an integral part of the sub-band speech coder and are needed regardless of the echo control technique employed. Advantages flow from the proposed invention as follows. The invention forms an adaptive determination of the echo return loss R for each sub-band for each information in that sub-band and its adjacent neighboring sub-bands. This assures that the frequency dependence of the echo path will be closely matched by the echo path model in the suppressor to exploit the full performance capabilities of the associated hybrid circuit in the echo path. Secondly, the intelligibility of the echo will be greatly diminished by the independent suppression of speech sub-bands. Speech clipping as perceived by a user will be reduced since the adaptive threshold levels are utilized within each sub-band independently. Speech perforation during double talk will also be minimized due to the dual adaptive threshold employed. The impact of echo on the sub-band coder bit allocation will be minimized. Also, the adaptation technique employed utilizing the inertia of the previous measurements and variable attack time will be less vunerable to error than current techniques. Analogous advantages flow from the proposed invention used in conjunction with a transform coder which analyzes the input into contiguous sub-bands by use of the corner frequencies as noted above.

The frequency domain information generated as the normal part of the speech coder operation is shared with the echo suppressor to form an effective analytical combination. The suppressor functions on an estimate of the speech spectrum itself rather than on the speech signal, thereby reducing the complexity of the suppressor circuits.

Having thus our invention with reference to a preferred embodiment, it will be apparent to those of skill in the art that numerous departures from the specific embodiment may be made without departing from the spirit and scope of the invention as described by the appended claims. Therefore, what is described in the claims is intended by way of description and not of limitation.

Having thus described our invention, what we desire to protect by Letters Patent is:

1. An improved adaptive frequency sub-band echo suppressor having an input spectrum comprising a plurality of contiguous frequency sub-bands, comprising:
   means for measuring signal energy level in each frequency sub-band;
   means for estimating an initial expected echo return loss level factor for each frequency sub-band by multiplying said signal energy level in each said frequency sub-band by a presently existing echo loss level factor for each frequency sub-band; and
   means for selecting a final expected echo return loss level factor for each said frequency sub-band as the larger of said echo return loss level factors from a group of echo return loss level factors comprising said initial expected echo return loss level factor of each frequency sub-band and the initial expected echo return loss level factor of any immediately adjacent frequency sub-bands; and means for estimating a final echo return loss level for each said frequency sub-band by multiplying the measured signal energy level in each said frequency sub-band by said final expected echo return loss level factor for each said frequency sub-band.

2. An improved method of operating an adaptive sub-band echo suppressor operating on an input spectrum comprising a plurality of contiguous frequency sub-bands, comprising steps of:

estimating initial expected echo return loss level factors for each frequency sub-band by measuring signal energy level in each frequency sub-band and multiplying said measured signal energy level in each frequency sub-band by a presently existing echo loss level factor for each frequency sub-band; and selecting a final expected echo return loss level factor for each frequency sub-band as the largest initial expected echo return loss level factor from a group of said echo return loss level factors corresponding to that of each frequency sub-band and its immediately adjacent frequency sub-bands; and estimating the final expected echo return loss level for each said frequency sub-band by multiplying the measured energy level of each said frequency sub-band by its final expected echo return loss level factor.

* * * * *